United States Patent
Joon et al.

(10) Patent No.: US 10,069,879 B2
(45) Date of Patent: Sep. 4, 2018

(54) METHOD FOR OPERATING APPLICATION PROVIDING GROUP CALL SERVICE USING MOBILE VOICE OVER INTERNET PROTOCOL

(71) Applicant: KAKAO CORP, Jeju-si (KR)

(72) Inventors: Young Joon, Gyeonggi-Do (KR); Hyang Deok, Seongnam-si (KR); Choon Taek, Seoul (KR); Jung Taek, Seoul (KR); Se Jong, Seoul (KR); Dae Gil, Seongnam-si (KR); Dong Kuk, Seoul (KR); Seok Kyoo, Seoul (KR); Ki Yong, Seoul (KR); Jun Jae, Seoul (KR); Chang Ho, Seoul (KR); Hyun Seok, Yongin-si (KR); Seong Hark, Seongnam-si (KR)

(73) Assignee: KAKAO CORP., Gyeonggi-do (KR)

( * ) Notice: Subject to any disclaimer, the term of this patent is extended or adjusted under 35 U.S.C. 154(b) by 233 days.

(21) Appl. No.: 14/438,861

(22) PCT Filed: Oct. 25, 2013

(86) PCT No.: PCT/KR2013/009584
§ 371 (c)(1),
(2) Date: Apr. 27, 2015

(87) PCT Pub. No.: WO2014/065631
PCT Pub. Date: May 1, 2014

(65) Prior Publication Data
US 2015/0256570 A1 Sep. 10, 2015

(30) Foreign Application Priority Data
Oct. 26, 2012 (KR) .......................... 10-2012-0119720

(51) Int. Cl.
*G06F 15/16* (2006.01)
*H04L 29/06* (2006.01)
(Continued)

(52) U.S. Cl.
CPC ........ *H04L 65/403* (2013.01); *H04L 12/1813* (2013.01); *H04L 51/04* (2013.01);
(Continued)

(58) Field of Classification Search
None
See application file for complete search history.

(56) References Cited

U.S. PATENT DOCUMENTS 7,734,692 B1 * 6/2010 Kaplan ............... H04L 12/1822
709/204
7,779,139 B2 * 8/2010 Vishwanath ............ H04L 69/08
709/204

(Continued)

FOREIGN PATENT DOCUMENTS

CN        1934885 A       3/2007
CN      101438559 A       5/2009

(Continued)

OTHER PUBLICATIONS

International Search Report for PCT/KR2013/009584, dated Feb. 28, 2014.

*Primary Examiner* — Joshua Joo
(74) *Attorney, Agent, or Firm* — Marshall, Gerstein & Borun LLP

(57) ABSTRACT

Disclosed is a method for operating an application providing a group call service using mobile voice over internet protocol (mVoIP). According to one embodiment, a request signal for a group call is received, and regardless of participation in the corresponding the group call, meta information for the group chat room corresponding to the group call can (Continued)

be received from a server. The meta information can comprise at least the group call connection status for each member of the group chat room.

16 Claims, 24 Drawing Sheets

(51) Int. Cl.
H04M 1/253 (2006.01)
H04M 1/725 (2006.01)
H04L 12/18 (2006.01)
H04L 12/58 (2006.01)
H04W 4/16 (2009.01)

(52) U.S. Cl.
CPC ...... *H04L 65/1016* (2013.01); *H04L 65/1069* (2013.01); *H04M 1/2535* (2013.01); *H04M 1/72552* (2013.01); *H04W 4/16* (2013.01)

(56) References Cited

U.S. PATENT DOCUMENTS

| | | | |
|---|---|---|---|
| 8,166,079 B2* | 4/2012 | Lewin | G06F 17/30902 707/803 |
| 8,856,355 B2* | 10/2014 | Queen | H04L 12/2814 345/2.1 |
| 9,736,089 B2* | 8/2017 | Chen | H04L 51/043 |
| 2002/0188731 A1* | 12/2002 | Potekhin | H04L 29/06027 709/227 |
| 2005/0074107 A1* | 4/2005 | Renner | H04M 3/42042 379/202.01 |
| 2007/0208806 A1* | 9/2007 | Mordecai | G06Q 10/10 709/204 |
| 2008/0104169 A1* | 5/2008 | Combel | H04L 51/04 709/204 |
| 2008/0159503 A1* | 7/2008 | Helbling | H04M 3/565 379/142.17 |
| 2008/0184326 A1* | 7/2008 | Nakajima | H04N 5/782 725/133 |
| 2012/0054008 A1* | 3/2012 | Watfa | G06Q 30/02 705/14.5 |
| 2012/0110099 A1* | 5/2012 | Fujihara | H04L 12/1818 709/206 |
| 2012/0230484 A1* | 9/2012 | Kannappan | H04M 3/565 379/202.01 |
| 2013/0039223 A1* | 2/2013 | Park | H04L 65/1073 370/259 |
| 2013/0063543 A1* | 3/2013 | Bentley | H04L 65/1083 348/14.03 |
| 2013/0246628 A1* | 9/2013 | Melnyk | H04L 67/322 709/227 |
| 2013/0293665 A1* | 11/2013 | Pang | H04M 3/42195 348/14.08 |
| 2014/0349621 A1* | 11/2014 | Vogedes | H04M 3/4288 455/413 |

FOREIGN PATENT DOCUMENTS

| | | |
|---|---|---|
| CN | 102550008 | 7/2012 |
| JP | H11331068 A | 11/1999 |
| JP | 2001-314657 A | 11/2001 |
| JP | 2004-185088 A | 7/2004 |
| JP | 2007-110631 A | 4/2007 |
| JP | 2007-150840 A | 6/2007 |
| JP | 2007-201928 A | 8/2007 |
| JP | 2008-17071 A | 1/2008 |
| JP | 2008-523662 A | 7/2008 |
| JP | 2009-225032 A | 10/2009 |
| KR | 10-2003-0085844 | 11/2003 |
| KR | 10-2006-0127986 | 12/2006 |
| KR | 10-2008-0112415 | 12/2008 |
| WO | WO-2007/077873 A1 | 7/2007 |
| WO | WO-2009/031194 A1 | 3/2009 |

* cited by examiner

METHOD FOR OPERATING APPLICATION PROVIDING GROUP CALL SERVICE USING MOBILE VOICE OVER INTERNET PROTOCOL

TECHNICAL FIELD

The following description relates to a method of operating an application providing a group call service using a mobile voice over Internet protocol (mVoIP).

BACKGROUND ART

Recently, a technology of constructing a mobile voice over IP (mVoIP) network through interworking with an Internet protocol (IP) multimedia subsystem (IMS) network and a portable Internet, and of providing a portable Internet subscriber with an mVoIP-based call service (for example, a voice call service or a video call service) as an additional service, has been developed. The portable Internet may include, for example, a wireless broadband Internet (WiBro), a mobile Worldwide Interoperability for Microwave Access (WiMAX), a 3rd generation partnership project (3GPP) long term evolution (LTE), a $4^{th}$ generation (4G) LTE, and the like.

An mVoIP is a technology of providing a VoIP service of a voice call level based on a data service of a portable Internet network. VoIP services may be classified into stationary VoIP services and mVoIP services, based on a mobility. In other words, a VoIP service based on a portable Internet, for example a mobile communication network, may be classified as an mVoIP service.

An instant message service may support an instant (real-time) text communication between at least two people, using a network, for example, the Internet. An instant messenger is a client to relay instant messages. The instant message service may enable real-time conversations and accordingly, differs from an electronic mail (e-mail) service. A conversation message may be transmitted every time people enter in a line and accordingly, the instant message service is similar to a telephone conversation rather than exchanging letters.

In addition, a group call service may enable a voice call between at least three participants at a time, and may include, for example, a conference call.

DISCLOSURE OF INVENTION

Technical Solutions

According to an aspect of the present invention, there is provided a method of operating an application providing a group call service using a mobile voice over Internet protocol (mVoIP), the method including: receiving a request signal for a group call; and receiving meta information for a group call chat room corresponding to the group call from a server, regardless of participation in the group call, wherein the meta information at least includes a group call connection status of each of members in the group call chat room.

The method may further include providing an interface used to receive an input on whether to participate in the group call now, in response to the request signal being received, automatically entering the group call chat room, in response to an input to participate in the group call now being received, and providing information regarding the group call using an indicator provided in the group call chat room, the information regarding the group call including the group call connection status.

The method may further include not automatically entering the group call chat room, in response to an input to participate in the group call later being received, and providing an interface enabling participation in the group call without a need to receive again the request signal when entering the group call chat room later.

The request signal may include request caller information and request receiver information, the request caller information may include information associated with a single request caller, and the request receiver information may include information associated with at least two request receivers.

The group call connection status may include a "connecting" status, a "connected" status, a "terminated" status, and an "impossible connection" status, and the server may change the group call connection status to the "terminated" status when the "connecting" status continues during a predetermined period of time.

The information regarding the group call may further include a profile photo of each of the members, and the providing of the information regarding the group call may include adjusting a dimness of the profile photo based on the group call connection status.

The meta information may further include at least one of a period of time of participation in the group call, a network connection status for the group call, and a member requesting the group call.

The method may further include providing at least one of an interface used to activate at least one of a voice change function, a mute function and a speakerphone function using an indicator provided in the group call chat room, an interface used to terminate the group call, and an interface used to fold or unfold the indicator.

The method may further include terminating the group call, in response to an input to terminate the group call being received, and providing an interface enabling participation in the group call without a need to receive again the request signal, and the information regarding the group call, using the indicator.

The terminating of the group call may include inputting a predetermined message associated with termination of the group call to the group call chat room.

The method may further include receiving a group call termination signal from the server, and deactivating a group call-related function provided in the group call chat room, in response to the group call termination signal being received. The server may transmit the group call termination signal based on a number of members currently participating in the group call.

The method may further include determining whether the group call chat room is already included in a chat room list, and adding the group call chat room to the chat room list based on a determination that the group call chat room is not included in the chat room list.

The method may further include providing an interface used to receive an input on whether to accept the request signal, in response to the request signal being received, entering the group call chat room, in response to an input to accept the request signal being received, providing information regarding the group call using an indicator provided in the group call chat room, the information regarding the group call including the group call connection status, providing an interface used to receive an input on whether to participate in the group call now, using the indicator, and providing an interface enabling participation in the group call without a need to receive again the request signal, in response to an input to participate in the group call later being received.

The method may further include deactivating at least one predetermined function associated with the group call chant room during the group call.

The method may further include at least one of playing a first preset notification when a member currently participating in the group call terminates the group call, playing a second preset notification when a member not participating in the group call participates in the group call, playing a third preset notification when a new message is input to the group call chat room, playing a fourth preset notification when a new message is input to another chat room, and playing a fifth preset notification when the request signal is received.

The method may further include providing a warning message saying that a group chat is to be terminated when leaving the group call chat room, in response to an input to leave the group call chat room being received during participation in the group call.

The method may further include providing information indicating that a participant is participating in the group call to an indicator associated with a background mode, in response to a reception of an input to allow the application to be executed in the background mode during participation in the group call.

According to an aspect of the present invention, there is provided a method of operating an application providing a group call service using an mVoIP, the method including: providing an interface used to transmit a request signal for a group call to members in a group chat room; determining group call members who are able to participate in the group call among the members, in response to an input to transmit the request signal being received; creating a new group call chat room including the group call members, when the members are different from the group call members; and transmitting the request signal in the new group call chat room.

The determining may include selecting the group call members based on at least one of an application version of each of the members and whether each of the members is allowed to participate in the group call.

The group chat room may include a chat room including at least three members.

The method may further include providing a predetermined warning message based on a number of the group call members. The predetermined warning message may include at least one of a warning message about impossibility to transmit the request signal when the number of the group call members exceeds a preset maximum threshold or is lower than a preset minimum threshold, a warning message used to determine whether to create the new group call chat room when the number of the group call members is equal to or higher than the preset minimum threshold, is equal to or lower than the preset maximum threshold and is different from a number of the members, and a warning message used to determine whether to create a new one-to-one call chat room when two group call members exist.

The predetermined warning message may include a list of members who are unable to participate in the group call among the members, and a reason why each of the members in the list is unable to participate in the group call.

The method may further include creating the new one-to-one call chat room with the two group call members based on a determination that the new one-to-one call chat room is to be created, and transmitting a request signal for a one-to-one call in the new one-to-one call chat room.

The method may further include inputting a predetermined message associated with a transmission of the request signal to the group call chat room.

According to an aspect of the present invention, there is provided a mobile terminal for providing a group call service using an mVoIP, the mobile terminal including: a receiver including a request signal receiver to receive a request signal for a group call, and a meta information receiver to receive meta information for a group call chat room corresponding to the group call from a server, regardless of participation in the group call, wherein the meta information at least includes a group call connection status of each of members in the group call chat room.

The mobile terminal may further include a controller, and an interface unit. In response to the request signal being received, the controller may control the interface unit to provide an interface used to receive an input on whether to participate in the group call now or later. In response to an input to participate in the group call now being received via the interface unit, the controller may automatically enter the group call chat room. In response to an input to participate in the group call later being received via the interface unit, the controller may not automatically enter the group call chat room and may control the interface unit to provide an interface enabling participation in the group call without a need to receive again the request signal when entering the group call chat room later. The controller may control the interface unit to provide an indicator including information regarding the group call, and the information regarding the group call may include the group call connection status.

BEST MODE FOR CARRYING OUT THE INVENTION

The following detailed description is provided in order to explain the embodiments by referring to the figures.

Figure 1A:
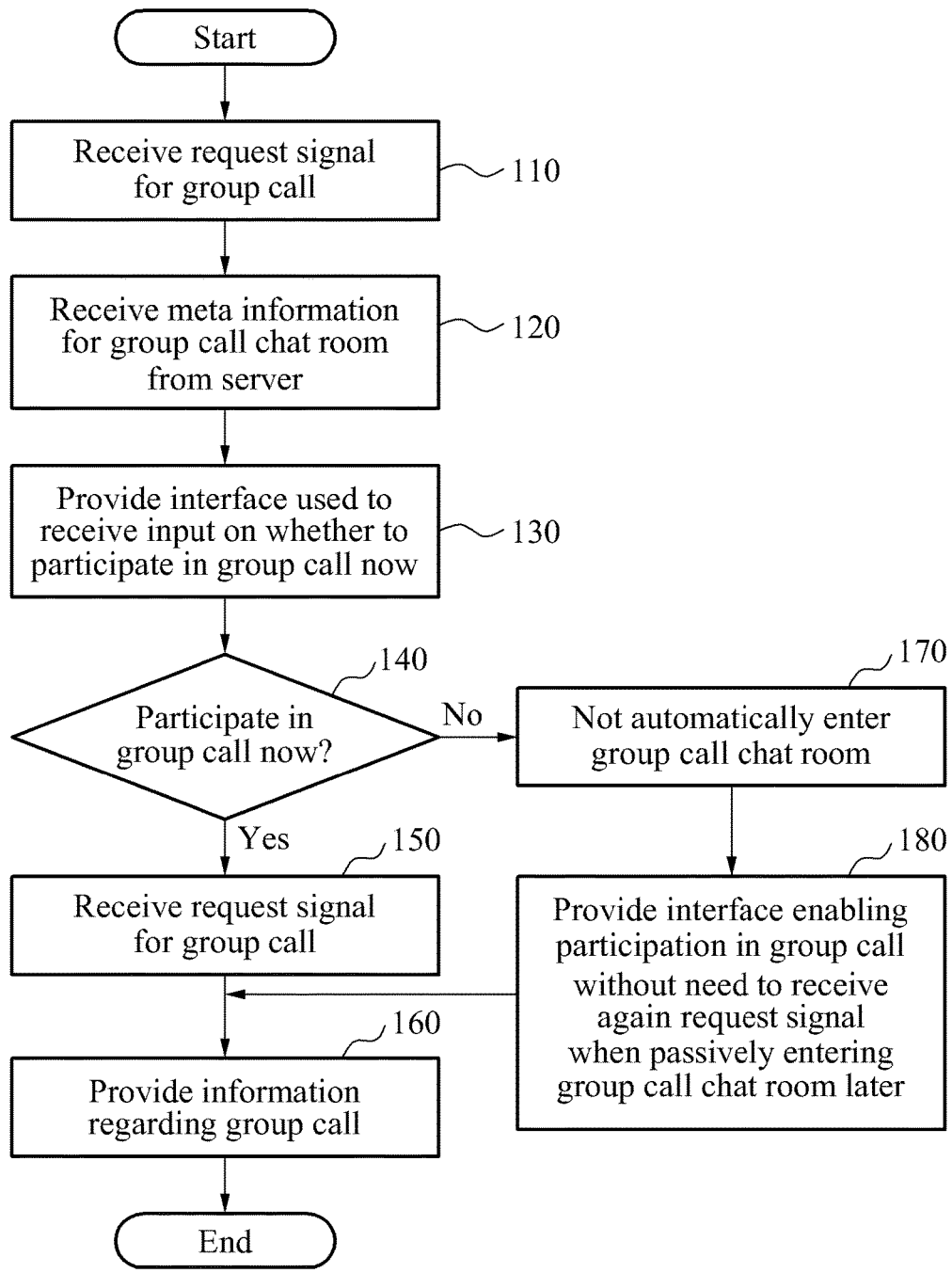
FIGS. 1A and 1B are diagrams provided to explain a method of receiving a group call in an application providing a group call service using a mobile voice over Internet protocol (mVoIP) according to an embodiment.
Figure 1B:
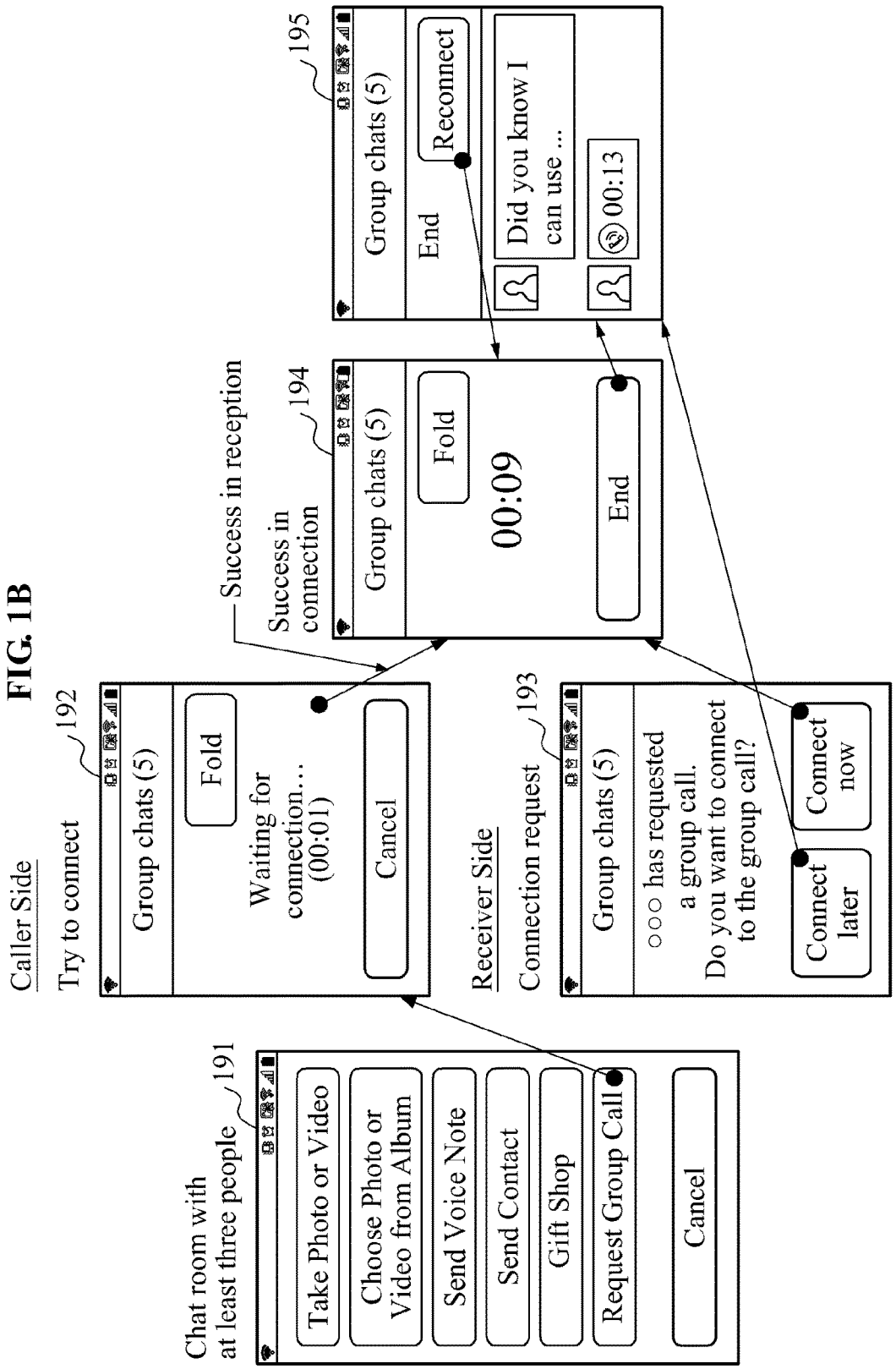

FIGS. 1A and 1B are diagrams provided to explain a method of receiving a group call in an application providing a group call service using a mobile voice over Internet protocol (mVoIP) according to an embodiment.

Referring to FIG. 1A, in operation 110, the application may receive a request signal for a group call.

The group call may include a voice call performed between at least three members using the mVoIP. In other words, the request signal may include request caller information and request receiver information. The request caller information may include information associated with a single request caller, and the request receiver information may include information associated with at least two request receivers.

However, depending on circumstances, the group call may include a voice call performed between two members using the mVoIP. For example, the group call may be requested only when at least three members are included, however, may be maintained when only two members remain in the group call after the group call is started.

In operation 120, the application may receive meta information for a group call chat room from a server, regardless of participation in the group call. In other words, when a user does not participate in a group chat as well as when the user participates in the group chat, the application may receive the meta information for the group call chat room from the server.

In the following description, the server may be an apparatus to support a group call service using the mVoIP in connection with the application, and may include, for example, an instant message server or an mVoIP server.

The meta information received from the server may include a group call connection status of each of members in the group call chat room. According to another embodiment, an application may receive, from a server, meta information including a group call connection status of each of members other than a user of the application among members in a group call chat room.

The group call connection status may be a status in which each of a plurality of members is connected to a group call, and may include, for example, a "connecting" status, a "connected" status, a "terminated" status, or an "impossible connection" status. For example, when the "connecting" status continues during a preset period of time (for example, 1 minute), the server may change the group call connection status to the "terminated" status.

In operation 130, the application may provide an interface used to receive an input on whether to participate in the group call now, in response to the request signal being received. In operation 140, the user may provide at least one of an input to participate in the group call now and an input to participate in the group call later, using the interface.

In operation 150, the application may automatically enter a group call chat room corresponding to the group call, in response to the input to participate in the group call now being received. The group call chat room may include a chat room that performs a similar function to a typical instant message group chat room and that additionally provides a function for a group call. For example, the group call chat room may include a plurality of members, may function as an instant messenger to exchange instant messages between the plurality of members, and may additionally provide a voice call function between the plurality of members using an mVoIP.

In operation 160, the application may provide information regarding the group call using an indicator provided in the group call chat room. The information regarding the group call may include a group call connection status of each of the members in the group call chat room. The indicator may be located in a preset area of a group call chat room interface (for example, a top portion of the group call chat room interface). An indicator according to another embodiment may be located in a portion of an area corresponding to the group call chat room in a chat room list.

In operation 170, the application may not automatically enter the group call chat room, in response to the input to participate in the group call later being received.

In this example, the user may manually enter the group call chat room later. For example, a group call chat room may be automatically added to a chat room list. The application may determine whether a group call chat room is already included in the chat room list, and may add the group call chat room to the chat room list based on a determination that the group call chat room is not included in the chat room list. Accordingly, the user may select the group call chat room from the chat room list, and may manually enter the group call chat room.

In operation 180, the application may provide an interface enabling participation in the group call without a need to receive again the request signal when entering the group call chat room. For example, the application may provide a reenter button (or a reconnect button) using the indicator provided in the group call chat room. When the user selects the reenter button, the application may exchange required information with the server to allow the user to participate in an ongoing group call.

More specifically, the application may receive meta information for the group call chat room from the server, even though the user does not participate in the group call. The meta information may include request caller information and request receiver information included in the request signal.

Accordingly, the application may provide a technology of allowing a user to freely participate in a group call until a group call termination signal is received from the server, after the group call is started in response to a reception of a request signal for the group call. The server may transmit the group call termination signal based on a number of members who are participating in the group call. For example, when a single member is participating in the group call, the server may transmit the group call termination signal to all of members in the group call chat room.

In addition, the meta information may further include a group call connection status of each of members in the group call chat room. Accordingly, the application may provide the group call connection status of each of the members in the group call chat room, regardless of whether each of the members is participating in the group call.

In other words, the application may provide information regarding whether each of the members is currently participating in the group call, when each of the members does not participate in the group call as well as when each of the members participates in the group call.

Accordingly, the user may be provided with information on members currently participating in a group call among members in a group call chat room to which the user belongs, and may participate in the group call or terminate the group call at any time during the group call.

The terminating the group call may be distinguished from receiving a group call termination signal from the server. For example, when a group call is terminated, a user may participate in the group call again later using a reenter button. When a group call termination signal is received from the server, the user may not participate in a corresponding group call any more.

For example, in response to the group call termination signal being received, the application may deactivate a group call-related function provided in the group call chat room. In this example, the group call chat room may perform the same function as a typical instant message group chat room. In other words, the user may start a new group call by transmitting a request signal for the new group call to the same members, and may participate in the new group call.

The group call may be distinguished from the group call chat room. For example, the application may provide the group call based on the group call chat room.

Also, participating in or terminating a group call may be distinguished from entering or leaving a group call chat room.

The entering the group call chat room may literally include entering a group call chat room that supports a group call service. On the other hand, the participating in the group call may include participating in a voice call (for example, a conference call) between a plurality of members using an mVoIP.

Similarly, the leaving the group call chat room may literally include leaving a group call chat room that supports a group call service. For example, when a user leaves a group call chat room, the application may change a group call chat room screen to a chat room list screen. On the other hand, the terminating the group call may include terminating a voice call (for example, a conference call) between a plurality of members using an mVoIP. As described above, when a group call is terminated, a user may participate in the group call again later using a reenter button while the group call is in progress by at least two members.

Accordingly, the user may not participate in the group call even though the user is in the group call chat room.

Referring to FIG. 1B, a user desiring to start a group call (hereinafter, referred to as a "request caller") may transmit a request signal for a group call using an interface configured to transmit the request signal (191). An application of the request caller may display a screen saying "waiting for connection" until at least one of users receiving the request signal (hereinafter, referred to as "request receivers") is connected (192).

Applications of the request receivers may provide an interface used to receive an input on whether to participate in the group call now, in response to the request signal being received from the request caller (193). When a request receiver enters an input to participate in the group call now using the interface, an application of the request receiver may automatically enter a group call chat room corresponding to the group call, may receive a group call connection status of each of members in the group call chat room from a server, and may provide information regarding the group call using an indicator provided in the group call chat room (194).

When a request receiver enters an input to participate in the group call later using the interface, an application of the request receiver may not automatically enter the group call chat room. When the request receiver manually enters the group call chat room later, the application of the request receiver may provide an interface (for example, a reenter button or a reconnect button) allowing the request receiver to participate in the group call without a need to receive again the request signal (195).

Additionally, the application of the request receiver may display members who are currently participating in the group call, using the indicator provided in the group call chat room, even though the request receiver does not participate in the group call.

When a request receiver selects a reenter button, an application of the request receiver may perform operations to participate in the group call. When the request receiver succeeds in participating in the group call, the application of the request receiver may provide information regarding the group call using the indicator provided in the group call chat room (195->194).

When a user (for example, a request caller or a request receiver) terminates a group call by selecting an end button after participating in the group call, an application of the user may provide an interface (for example, a reenter button or a reconnect button) allowing the user to participate in the group call without a need to receive again the request signal (194->195).

Accordingly, an application according to an embodiment may provide a technology of allowing a user to freely participate in a group call or terminate the group call until a group call termination signal is received from a server after the group call is started, through the above-described operations.

Figure 2A:
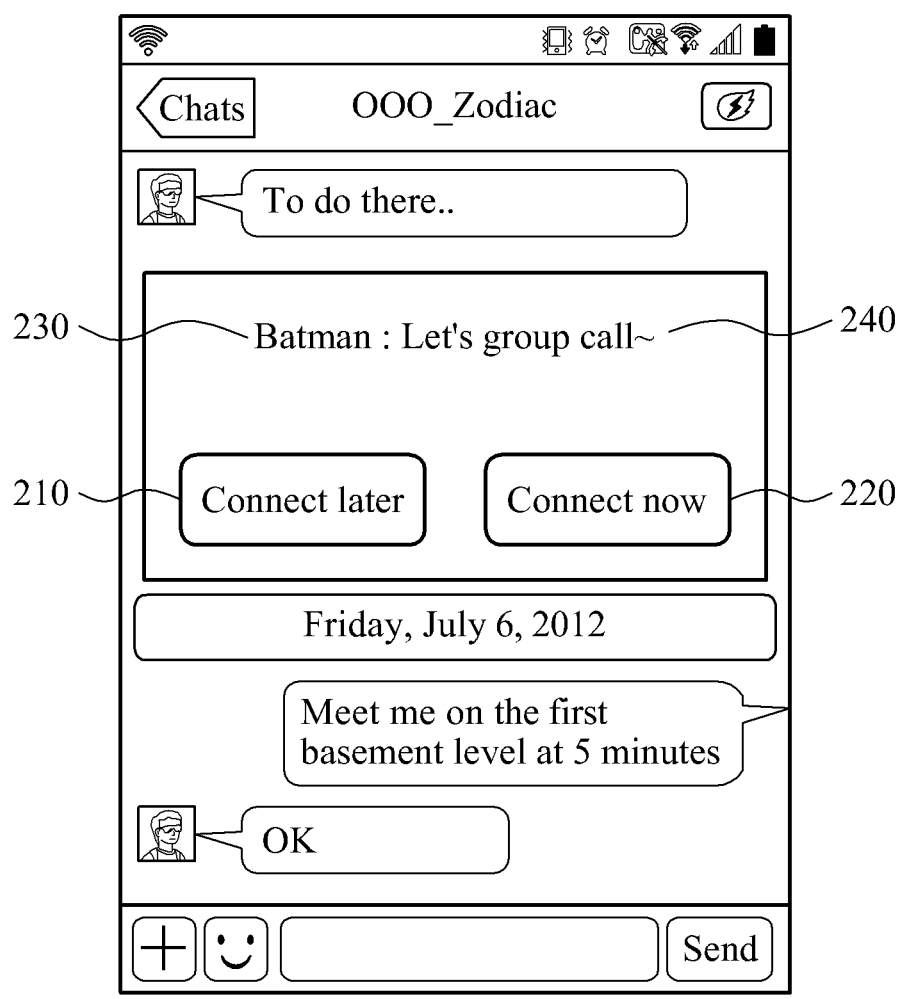
FIGS. 2A through 2C are diagrams provided to explain an interface used to receive an input on whether to participate in a group call now in response to a request signal being received, according to an embodiment.
Figure 2B:
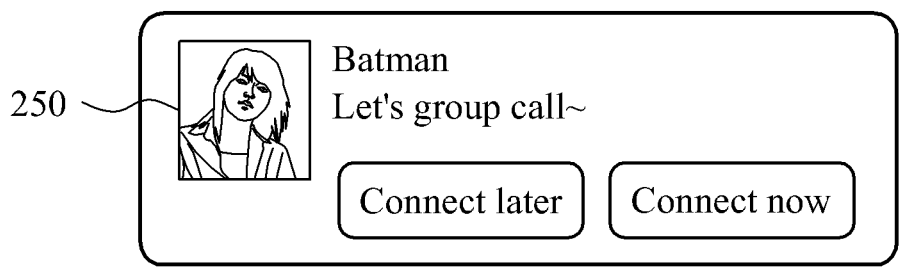
Figure 2C:
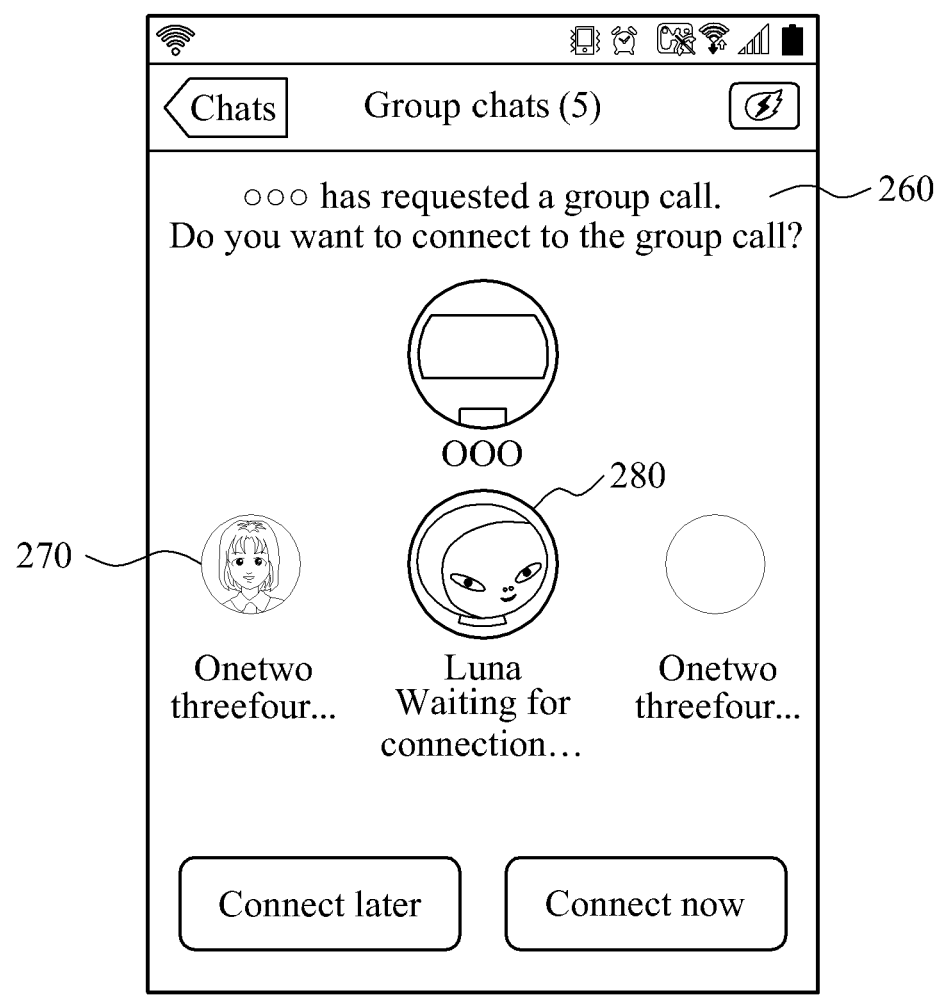

FIGS. 2A through 2C are diagrams provided to explain an interface used to receive an input on whether to participate in a group call now in response to a request signal being received, according to an embodiment.

In an example, referring to FIG. 2A, an interface used to receive an input on whether to participate in a group call now may include a button 220 for an input to participate in the group call now, and a button 210 for an input to participate in the group call later.

The interface may further include information 230 associated with a member sending a request signal for a group call. For example, the interface may display an identification (ID) of a member sending a request signal for a group call.

In addition, the interface may further include a predetermined message 240 corresponding to a request signal for a group call. For example, a message saying "Let's group call~" may correspond to the request signal.

In another example, referring to FIG. 2B, an interface used to receive an input on whether to participate in a group call now may further include a profile photo 250 of a member sending a request signal for a group call. Accordingly, a request receiver may more intuitively recognize a request caller.

In still another example, referring to FIG. 2C, an interface used to receive an input on whether to participate in a group call now may further include information 270 regarding a member receiving a request signal for a group call together with a user of the interface. In this example, when the member receives the request signal, but does not yet participate in the group call, an application may process a profile photo of the member to dimly appear.

Also, the interface may further include a group call connection status 280 of the user of the interface. For example, an application may display a group call connection status of the user of the interface as "waiting for connection" while waiting until an input to participate in the group call now is received from the user of the interface.

Figure 3A:
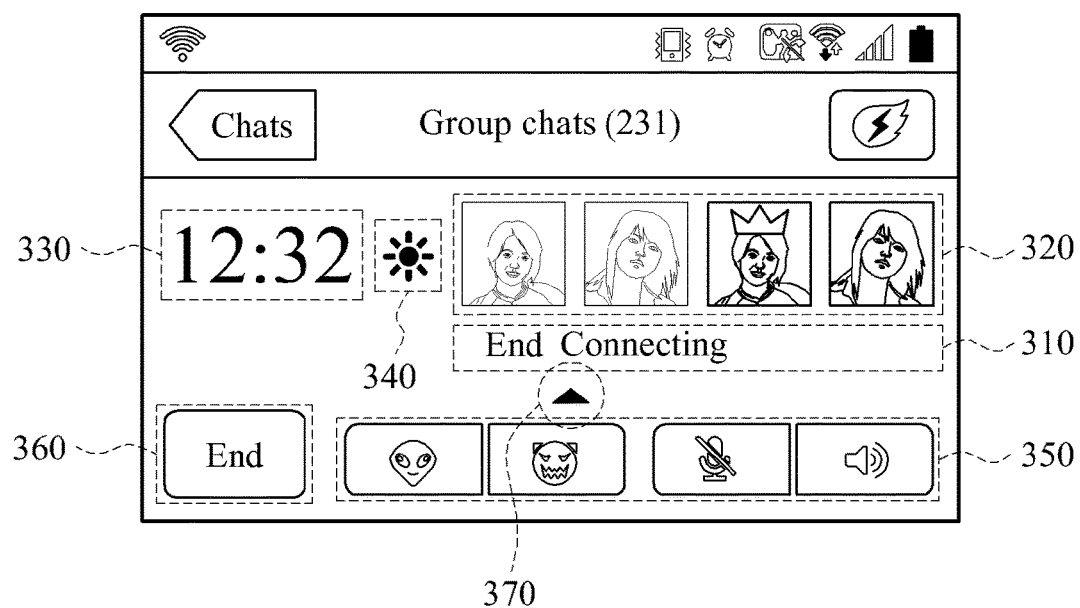
FIGS. 3A and 3B are diagrams provided to explain an indicator used to provide information regarding a group call according to an embodiment.
Figure 3B:
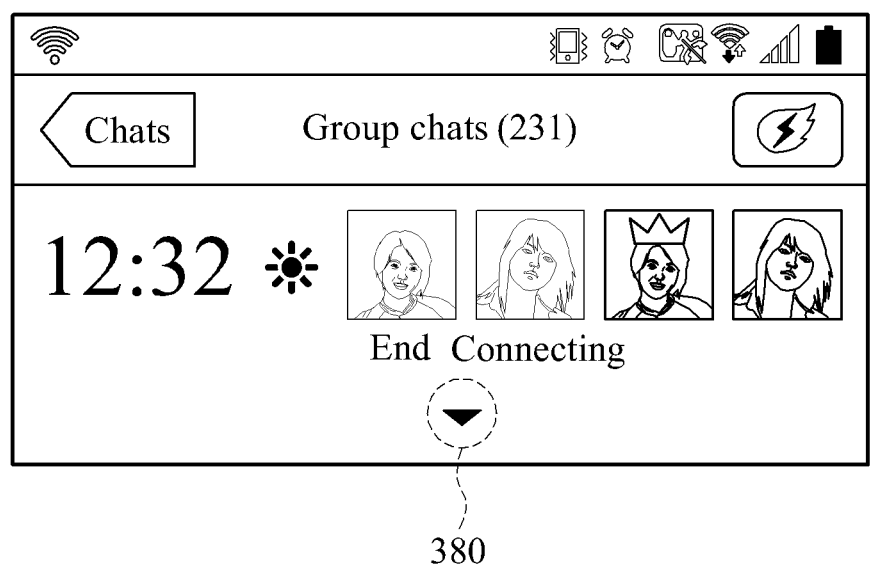

FIGS. 3A and 3B are diagrams provided to explain an indicator used to provide information regarding a group call according to an embodiment.

In an example, referring to FIG. 3A, information regarding a group call may include a group call connection status 310 of each of members in a group call chat room and a profile photo 320 of each of the members.

In this example, an application may adjust a dimness of the profile photo based on the group call connection status. For example, the application may process a profile photo of a member in a "terminated" status or a "connecting" status to dimly appear. In this example, the application may process a profile photo of a member currently participating in the group call to clearly appear.

In another example, information regarding a group call may further include at least one of a period of time 330 of participation in a group call, a network connection status 340 for the group call, and a member requesting the group call. The application may generate the information regarding the group call based on meta information received from a server.

The period of time 330 may be measured from a point in time at which a user of the application participates in a group call. When the user ends a group call and participates in the group call again, the period of time 330 may be measured from a point in time at which the user participates in the group call again.

The network connection status 340 may be displayed using a weather icon, for example, a sun icon, a cloud icon or a rain icon. For example, when a network connection status is good, the application may display the sun icon. When the network connection status is normal, the application may display the cloud icon. When the network connection status is bad, the application may display the rain icon. When the network connection status is changed during a group call, the application may change an icon and may play back a notification sound notifying a change in the network connection status.

Additionally, the application may display the member requesting the group call by assigning a predetermined graphic effect (for example, a crown icon) to a profile photo of the member.

In still another example, an application may further provide at least one of an interface 350 used to activate at least one of a voice change function, a mute function and a speakerphone function using an indicator provided in the group call chat room, an interface 360 used to terminate a group call, and an interface 370 used to fold the indicator.

When the voice change function is activated, the application may change a user's voice based on the activated voice change function, and may transmit the changed voice. When the mute function is activated, the application may prevent a user's voice from being transferred to the other party. When the speakerphone function is activated, the application may play back a voice of the other party through a speaker so that people around the application may listen to conversation.

When an input to terminate a group call is received, the application may terminate the group call and may provide an interface enabling participation in the group call again.

When an input to fold an indicator is received, the application may reduce the indicator so that only information regarding a group call may be displayed.

For example, referring to FIG. 3B, in response to an input to fold an indicator being received, the application may display a group call connection status of each of members in a group call chat room, a profile photo of each of the members in the group call chat room, a period of time of participation in a group call, a network connection status for the group call and a member requesting the group call, instead of displaying an interface used to activate at least one of a voice change function, a mute function and a speakerphone function, an interface used to terminate the group call, and an interface used to fold the indicator.

In this example, the application may further provide an interface 380 to unfold the indicator. When an input to unfold the indicator is received, the application may display the interface used to activate at least one of the voice change function, the mute function and the speakerphone function, the interface used to terminate the group call, and the interface used to fold the indicator.

Figure 4A:
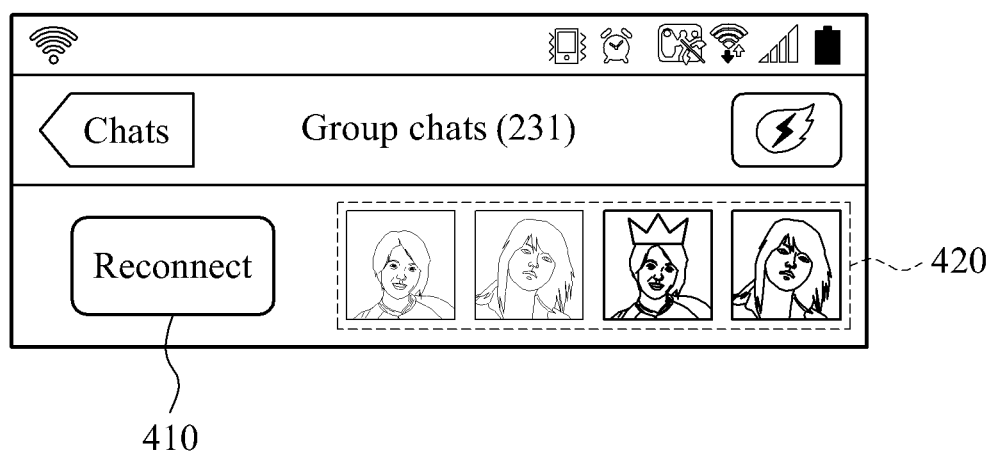
FIGS. 4A and 4B are diagrams provided to explain an interface enabling participation in a group call without a need to receive again a request signal according to an embodiment.
Figure 4B:
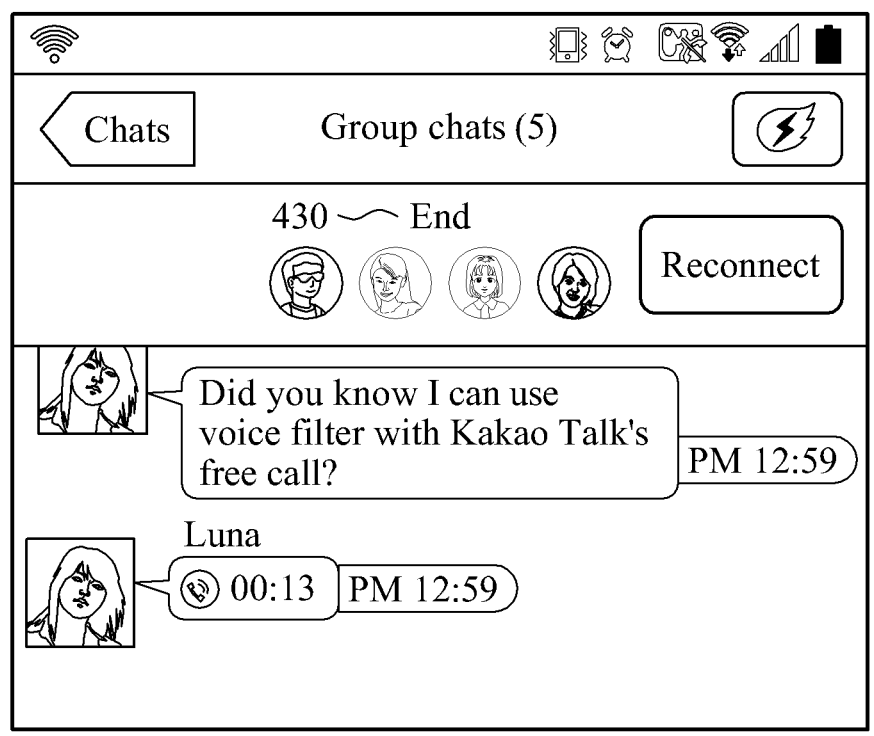

FIGS. 4A and 4B are diagrams provided to explain an interface enabling participation in a group call without a need to receive again a request signal according to an embodiment.

In an example, referring to FIG. 4A, an interface enabling participation in a group call without a need to receive again a request signal may include a reconnect button 410 or a reenter button.

In this example, an application may provide information 420 regarding the group call, using an indicator provided in a group call chat room. The information 420 may include a group call connection status.

In another example, referring to FIG. 4B, an application may further provide a connection status 430 of a user of the application using an indicator provided in a group call chat room.

Figure 5:
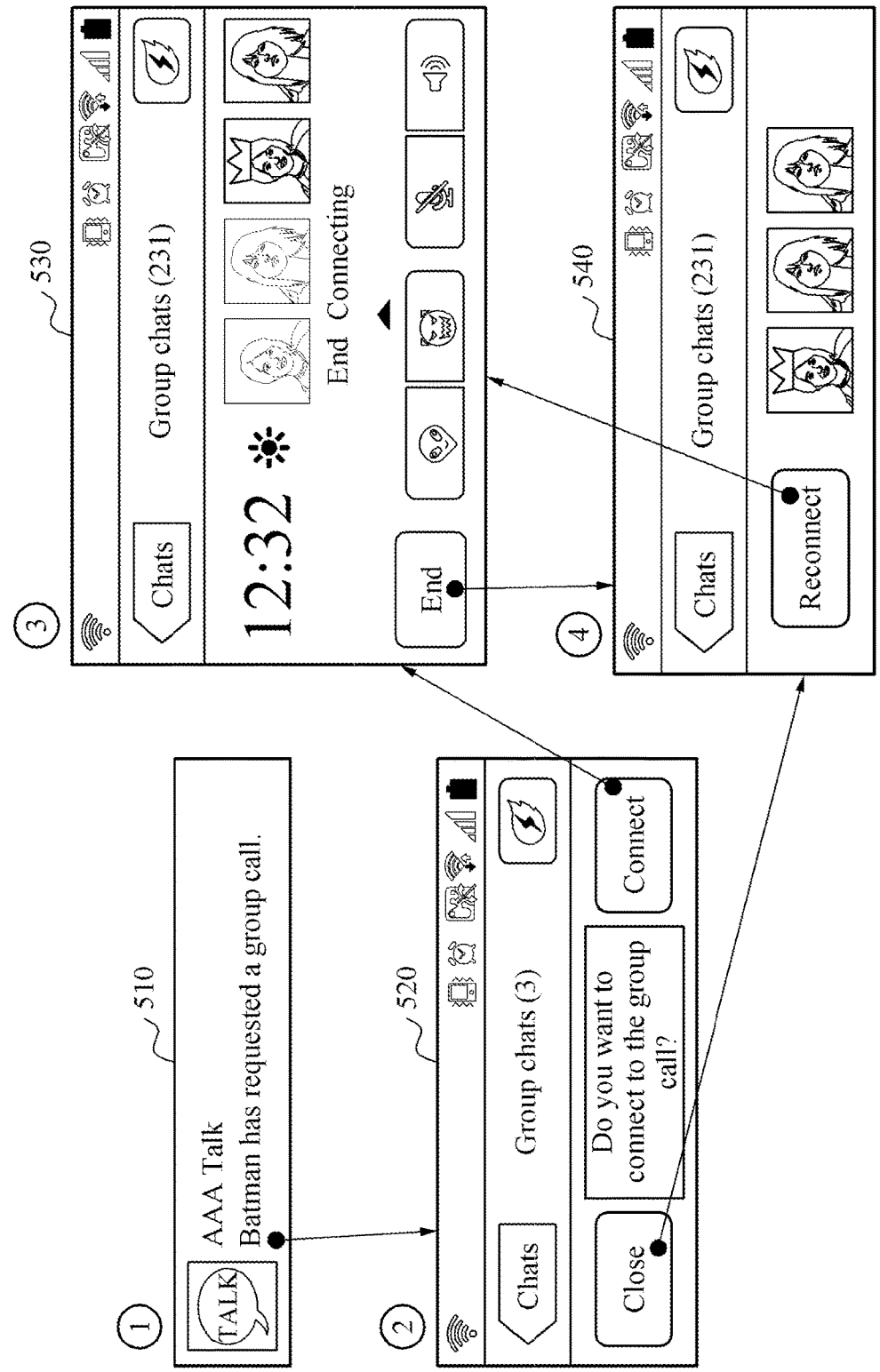
FIG. 5 is a diagram provided to explain an interface used to receive an input on whether to accept a request signal in response to the request signal being received according to an embodiment.

FIG. 5 is a diagram provided to explain an interface used to receive an input on whether to accept a request signal in response to the request signal being received according to an embodiment.

Referring to FIG. 5, an application according to an embodiment may provide an interface used to receive an input on whether to accept a request signal for a group call, in response to the request signal being received (510).

In response to an input to accept the request signal being received, the application may enter a group call chat room corresponding to the group call. The application may provide an interface used to receive an input on whether to participate in the group call now, using an indicator provided in the group call chat room (520).

The above description of FIGS. 1 through 4B may equally be applicable to subsequent operations of the application and accordingly, will not be repeated here. For example, when an input to participate in the group call now is received, the application may display information regarding the group call, and the like (530). When an input to participate in the group call later is received, the application may an interface enabling participation in the group call without a need to receive again the request signal (540).

Figure 6:
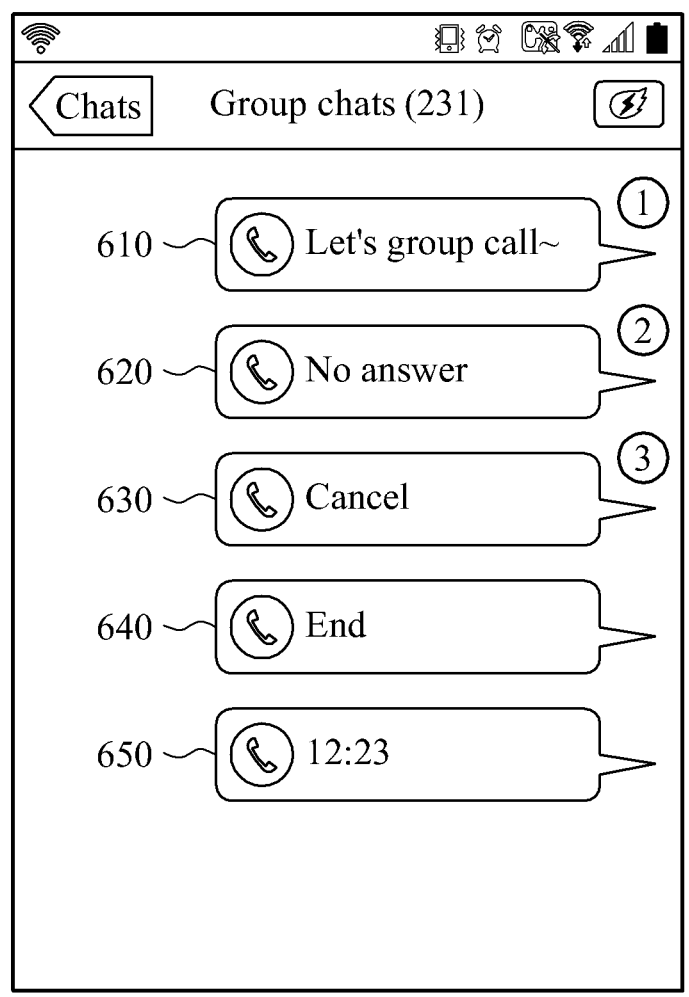
FIG. 6 is a diagram provided to explain a predetermined message associated with a group call according to an embodiment.

FIG. 6 is a diagram provided to explain a predetermined message associated with a group call according to an embodiment.

Referring to FIG. 6, an application according to an embodiment may input a predetermined message in a group call chat room corresponding to the group call, in response to an operation associated with the group call being performed. The application may display each message in a form (for example, a speech bubble) the same as or similar to a message directly input by a user.

For example, when a request signal for a group call is transmitted, the application may input a message 610 saying "Let's group call~" to a group call chat room. When no answer is received from request receivers, the application may input a message 620 saying "No answer" to the group call chat room.

When an input to cancel the group call before the group call is started is received after the request signal is transmitted, the application may input a message 630 saying "Cancel" to the group call chat room. When an input to terminate the group call is received after the group call is started, the application may input a message 640 saying "End" to the group call chat room. The application may also input a message 650 indicating a period of time of participation in the group call to the group call chat room.

In another example, an application may play preset notifications corresponding to various events occurring in association with a group call, although not shown in the drawings. The preset notifications may include, for example, at least one of an effect sound, a ringtone, a vibration, a light emitting diode (LED) lamp, and a graphic effect of a display.

For example, when a member currently participating in a group call terminates the group call, the application may play a first preset notification (for example, Ding-Dong). When a member not participating in a group call participants in the group call, the application may play a second preset notification (for example, Ding). When a new message is input to a group call chat room, the application may play a third preset notification (for example, Tick-Tock). When a new message is input to another chat room, the application may play a fourth preset notification (for example, a notification based on a basic setting of the application). When a request signal for a group call is received, the application may play a fifth preset notification (for example, a ringback tone or a vibration).

In other words, the application may play different notifications based on various cases occurring in association with a group call and accordingly, may provide a technology allowing a user to more easily recognize a situation based on a played notification only.

Figure 7A:
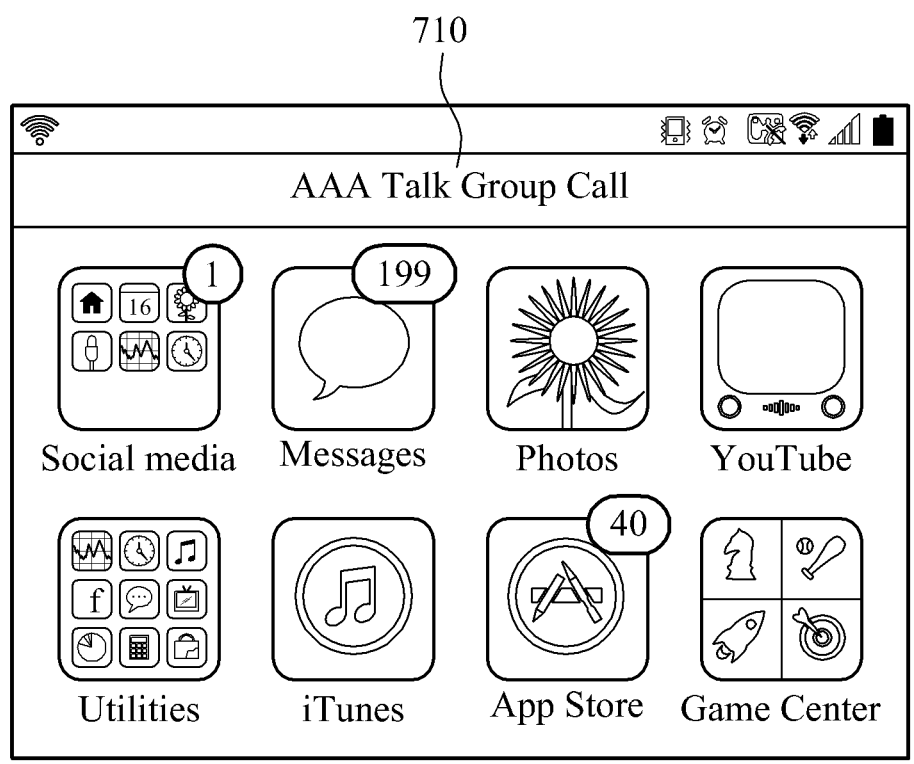
FIGS. 7A and 7B are diagrams provided to explain an indicator associated with a background mode according to an embodiment.
Figure 7B:
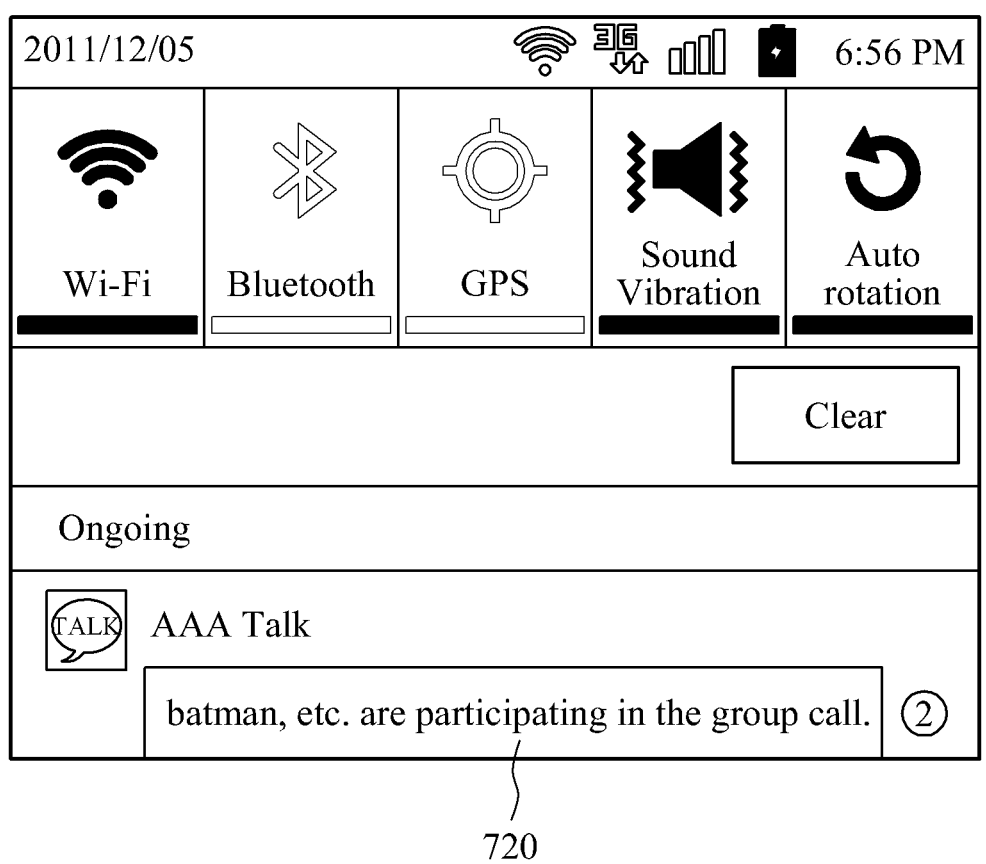

FIGS. 7A and 7B are diagrams provided to explain an indicator associated with a background mode according to an embodiment.

In an example, referring to FIG. 7A, an application may receive an input to allow the application to be executed in the background mode during participation in a group call.

For example, when an input of a home button in a mobile terminal including the application is received using the application during the participation in the group call, the application may recognize the input of the home button as an input to execute the application in the background mode.

In this example, the application may provide information indicating that a participant is participating in the group call to an indicator 710 associated with the background mode. In another example, referring to FIG. 7B, an application may provide information indicating that a participant is participating in a group call to a notification window 720 associated with a background mode.

Figure 8:
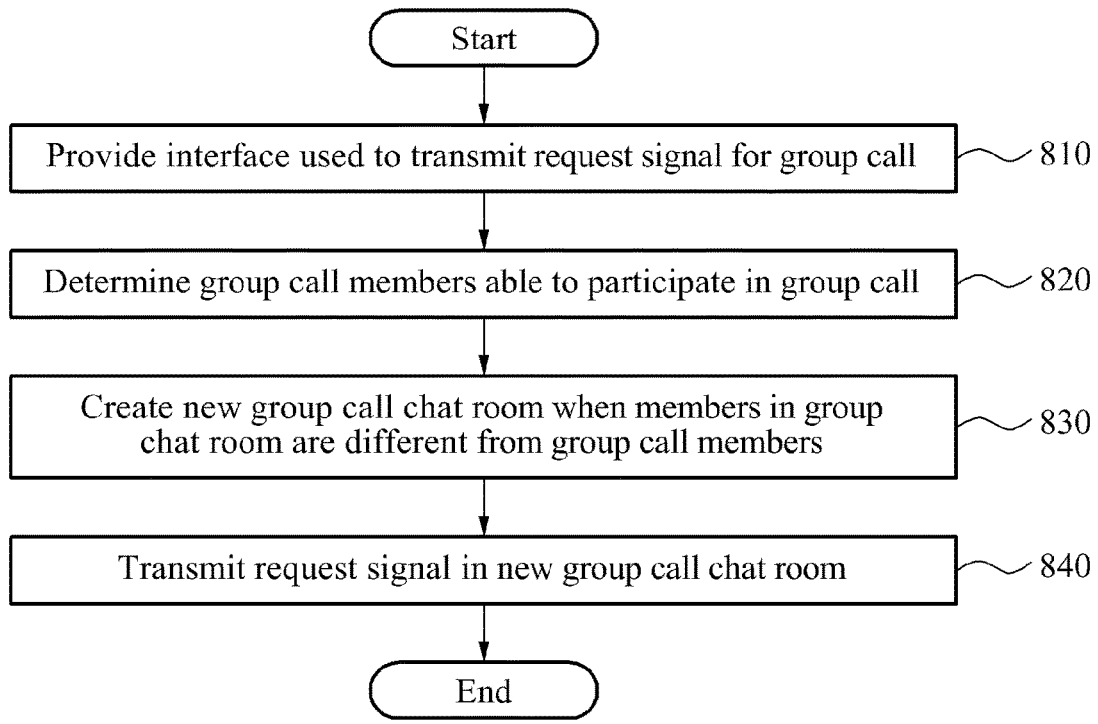
FIG. 8 is a flowchart illustrating a method of making a group call in an application providing a group call service using an mVoIP according to an embodiment.

FIG. 8 is a flowchart illustrating a method of making a group call in an application providing a group call service using an mVoIP according to an embodiment.

Referring to FIG. 8, in operation 810, the application may provide an interface used to transmit a request signal for a group call to members in a group chat room.

Figure 9:
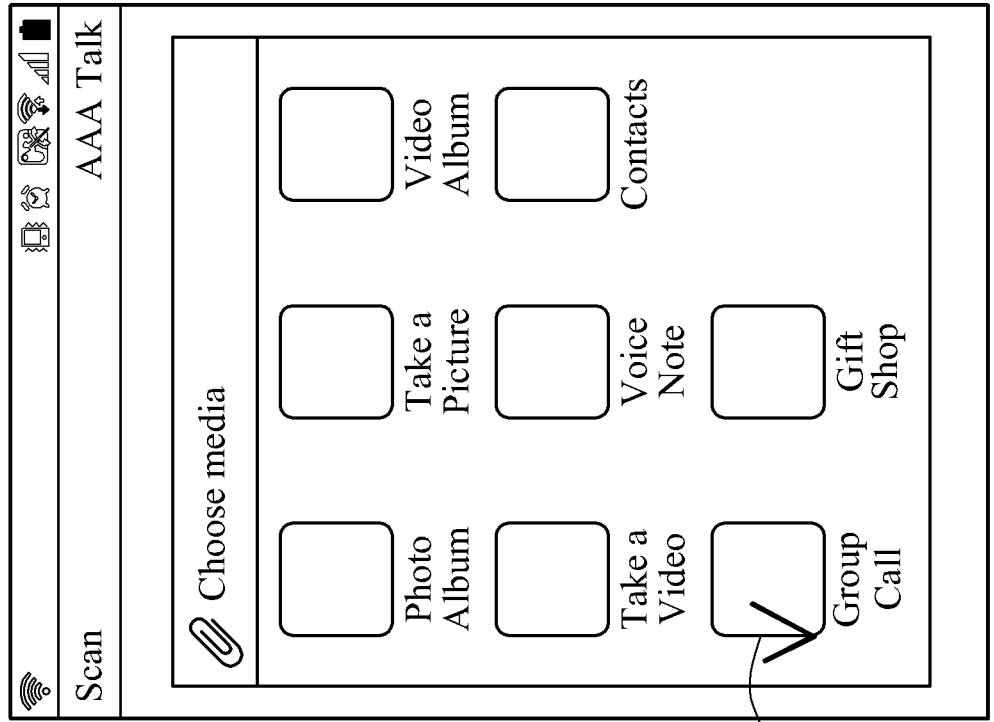
FIG. 9 is a diagram provided to explain an interface used to transmit a request signal for a group call according to an embodiment.
Figure 9:
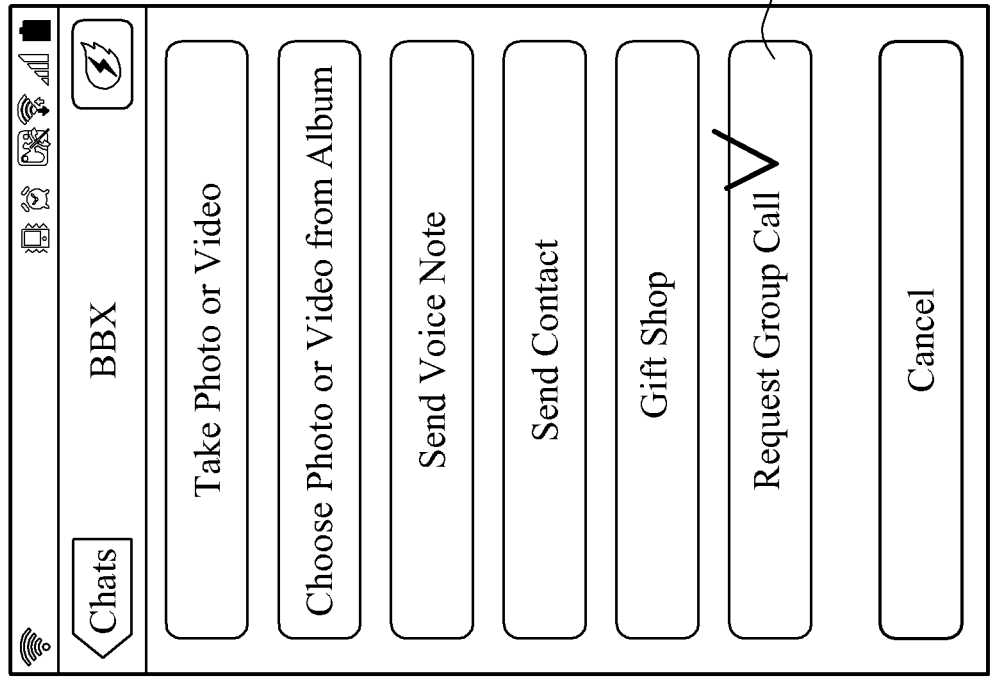

For example, referring to FIG. 9, the application may provide a group call request button 910 to transmit the request signal to the members in the group chat room.

In this example, the group chat room may include a chat room including at least three members. In other words, the application may provide an interface used to transmit a request signal for a group call to only the chat room including at least three members.

In operation 820, the application may determine group call members who are able to participate in the group call among the members in the group chat room, in response to an input to transmit the request signal being received.

The application may determine the group call members based on an application version of each of the members in the group chat room. For example, the application may select, as a member unable to participate in the group call, a member having a terminal in which an application with a version lower than a version of an application supporting a group call is installed.

The application may also determine the group call members based on whether each of the members in the group chat room is allowed to participate in the group call. For example, the application may select a member who deactivates a group call as a member unable to participate in the group call.

In operation 830, the application may create a new group call chat room including the group call members, when the members in the group chat room are different from the group call members.

The application may provide a user with a warning message about whether to create a new group call chat room including the group call members, which will be further described with reference to FIGS. 10A through 10D.

In operation 840, the application may transmit the request signal in the new group call chat room.

FIGS. 10A through 10D are diagrams provided to explain a predetermined warning message provided based on a number of group call members according to an embodiment.

An application according to an embodiment may provide a user with a predetermined warning message based on a number of group call members who are able to participate in a group call.

For example, in response to an input to select an interface 1010 used to transmit a request signal for a group call being received, the application may determine the group call members among members in a group chat room. In this example, the application may provide a user with a predetermined warning message based on a number of the determined group call members. In the following description, a number of the members in the group chat room and the number of the group call members may be calculated to include a request caller.

Figure 10A:
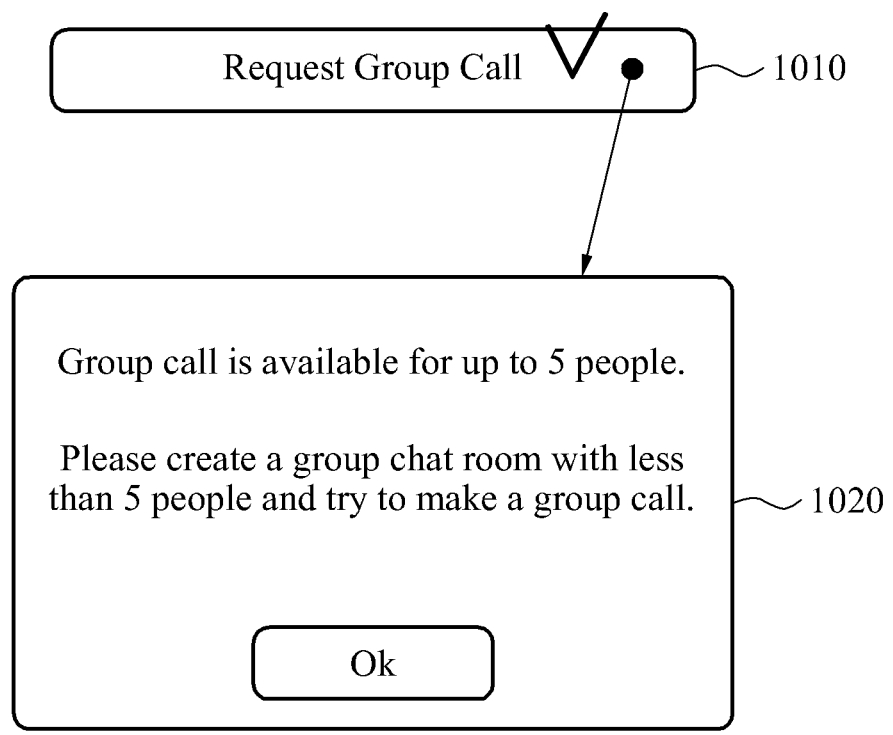
FIGS. 10A through 10D are diagrams provided to explain a predetermined warning message provided based on a number of group call members according to an embodiment.

For example, referring to FIG. 10A, when the number of the group call members exceeds a preset maximum threshold (for example, five people), the application may provide the user with a warning message 1020 about impossibility to transmit a request signal for a group call.

Figure 10B:
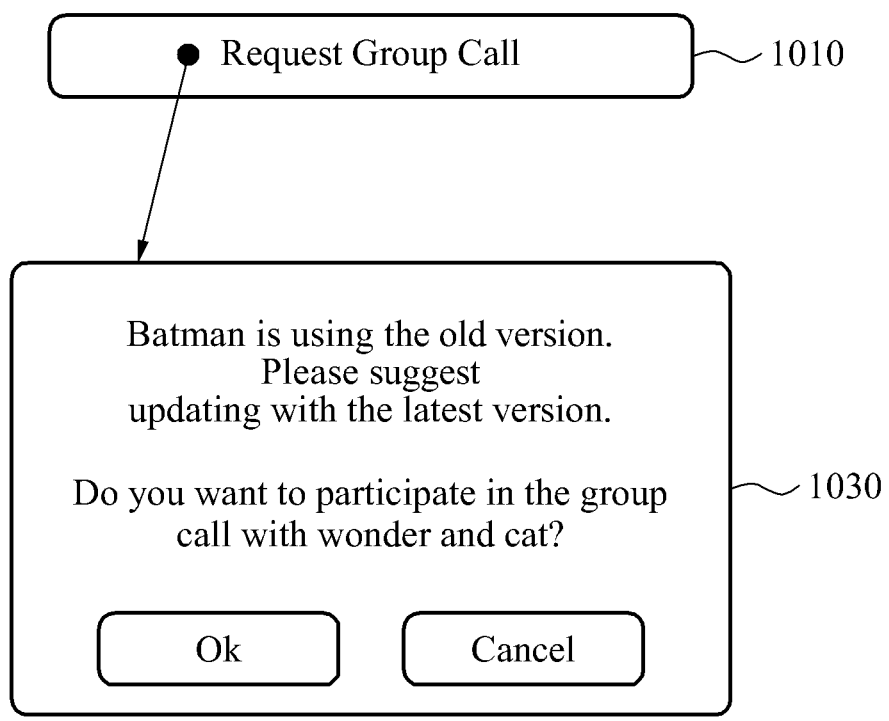

Referring to FIG. 10B, when the number of the group call members is equal to or higher than a preset minimum threshold (for example, three people), is equal to or lower than a preset maximum threshold (for example, five people), and is different from the number of the members in the group chat room, the application may provide the user with a warning message 1030 used to determine whether to create a new group call chat room. When creation of a new group call chat room is determined, the application may create a new group call chat room including the group call members, and may transmit a request signal for a group call in the new group call chat room.

Figure 10C:
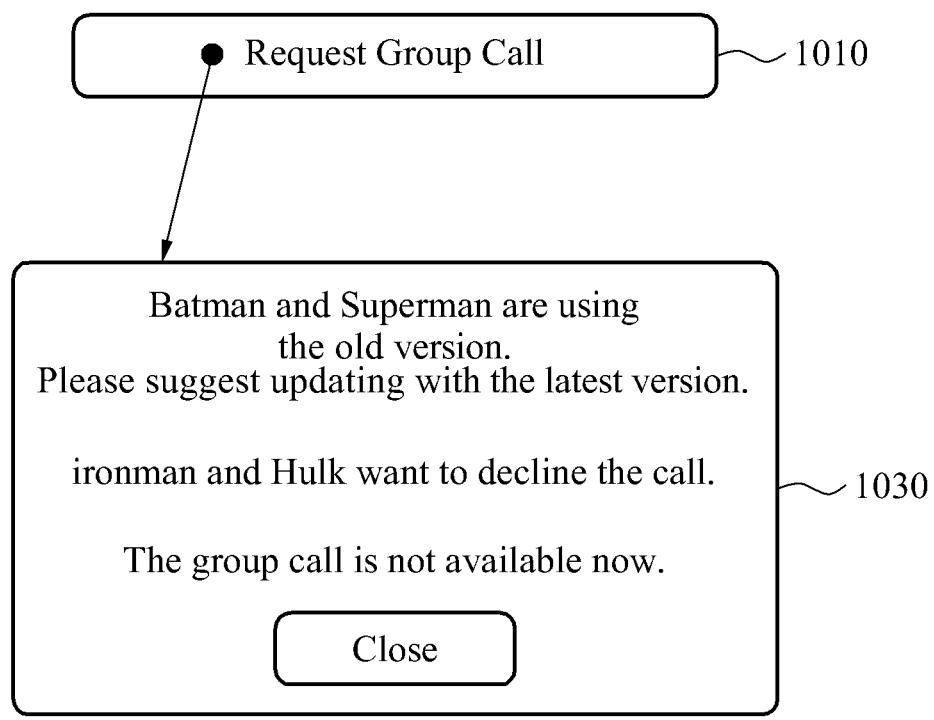

Referring to FIG. 10C, when the number of the group call members is lower than a preset minimum threshold (for example, two people), the application may provide the user with a warning message 1040 about impossibility to transmit a request signal for a group call.

Figure 10D:
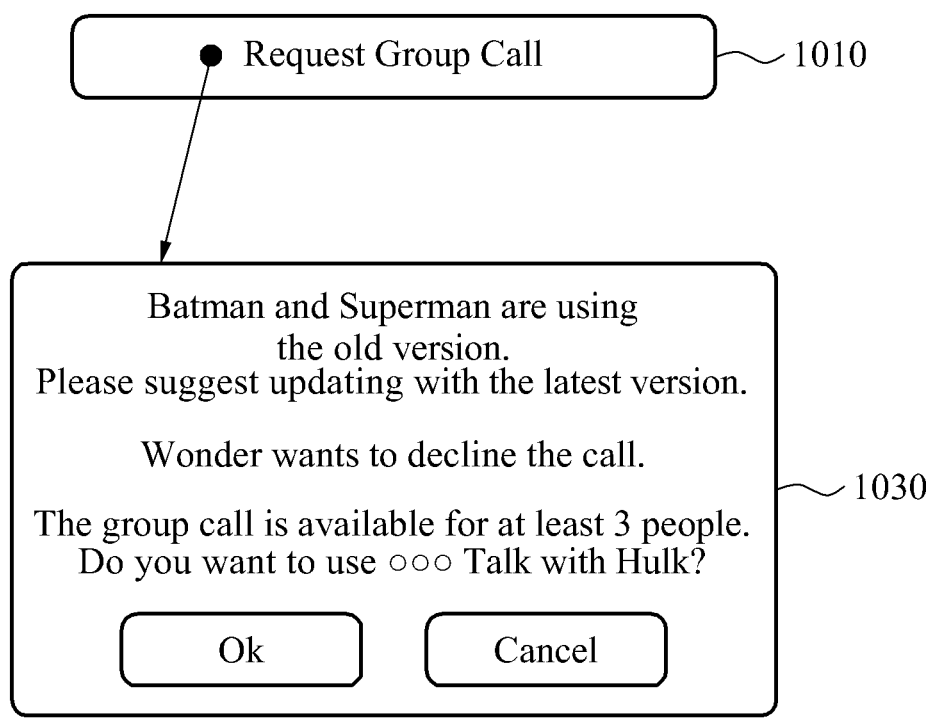

Referring to FIG. 10D, when two group call members exist, the application may provide the user with a warning message 1040 used to determine whether to create a new one-to-one call chat room. When creation of a new one-to-one call chat room is determined, the application may create a new one-to-one call chat room including the two group call members, and may transmit a request signal for a one-to-one call in the new one-to-one call chat room.

Each of the above-described warning messages may include a list of members unable to participate in the group call among the members in the group chat room, and a reason why each of the members in the list is unable to participate in the group call.

Figure 11A:
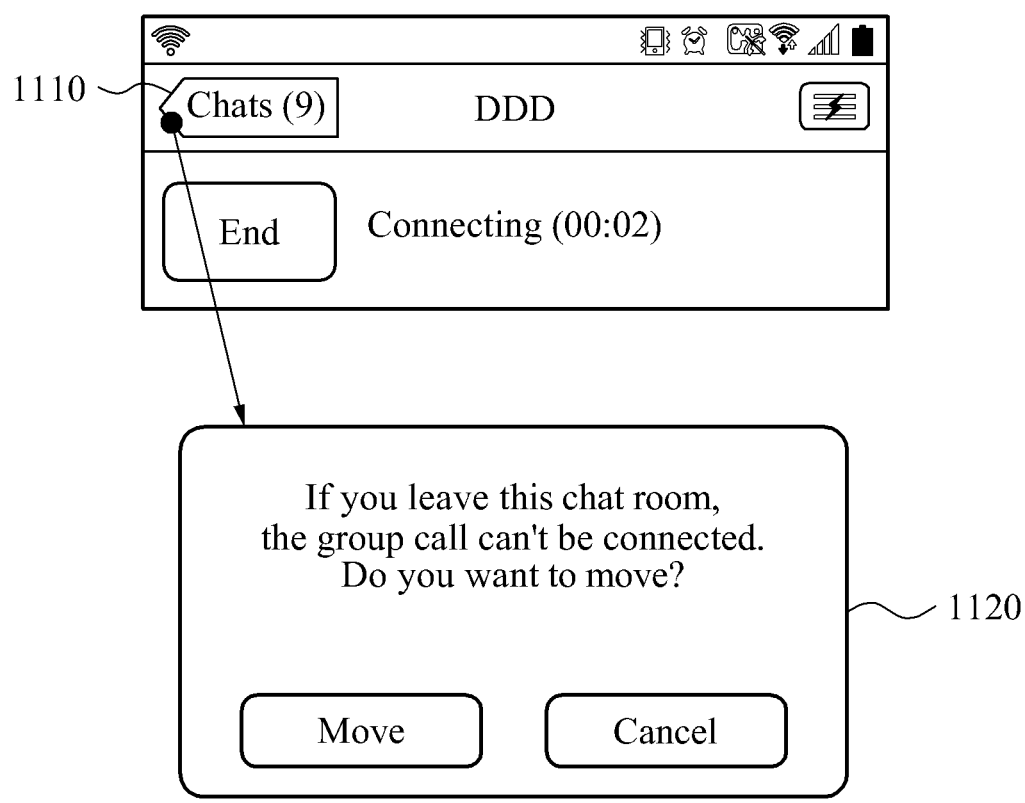
FIGS. 11A and 11B are diagrams provided to explain a predetermined warning message provided when an input to leave a group call chat room is received according to an embodiment.
Figure 11B:
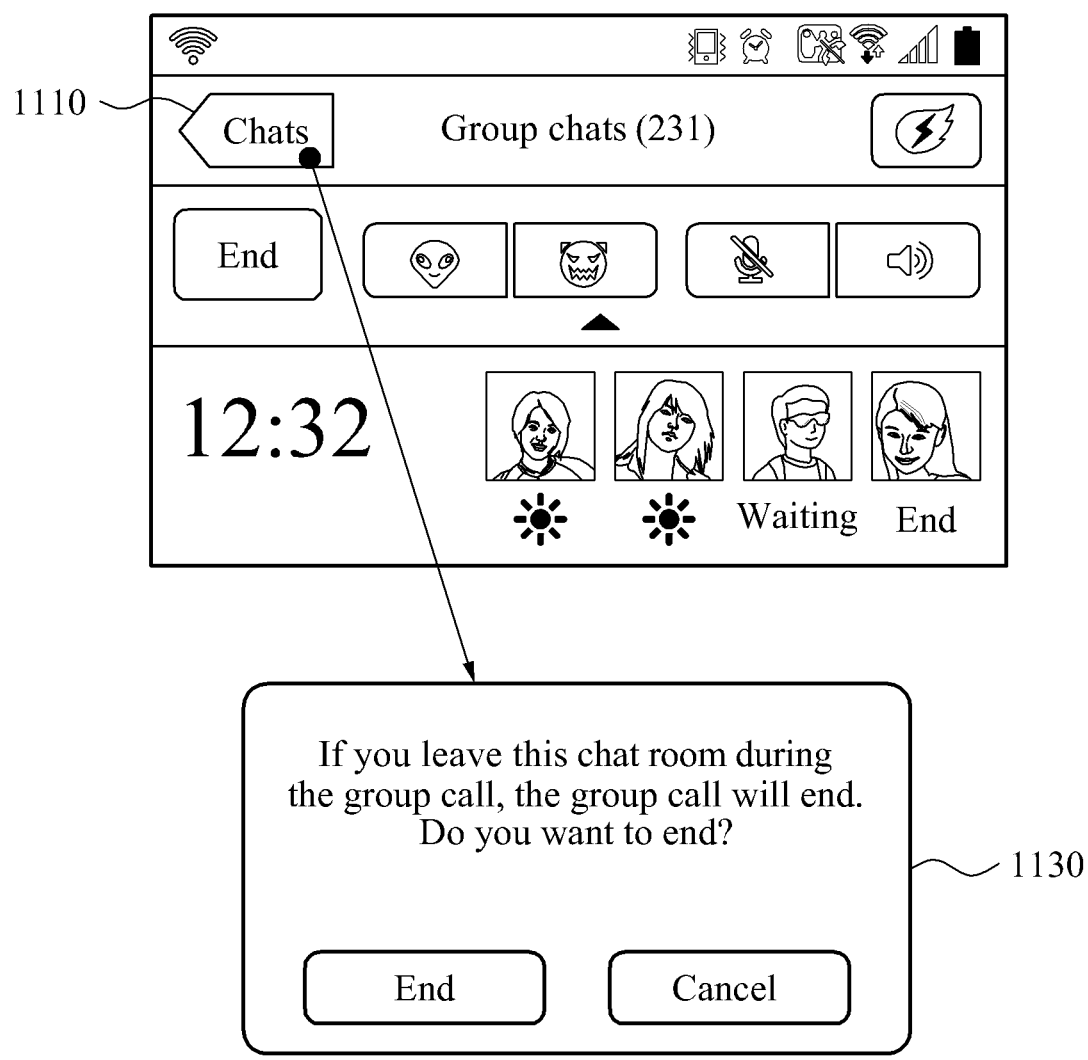

FIGS. 11A and 11B are diagrams provided to explain a predetermined warning message provided when an input to leave a group call chat room is received according to an embodiment.

In an example, referring to FIG. 11A, in response to an input 1110 to leave a group call chat room being received during participation in (or connection to) a group call, an application according to an embodiment may provide a user with a warning message 1120 about impossibility to participate in (or connect to) the group chat when leaving the group call chat room.

In this example, the application may interrupt participating in the group chat based on a determination to leave the group call chat room.

In another example, referring to FIG. 11B, in response to an input 1110 to leave a group call chat room being received during participation in a group call, the application may provide the user with a warning message 1130 saying that a group chat will be terminated when leaving the group call chat room.

In this example, the application may terminate the group chat based on a determination to leave the group call chat room.

Figure 12:
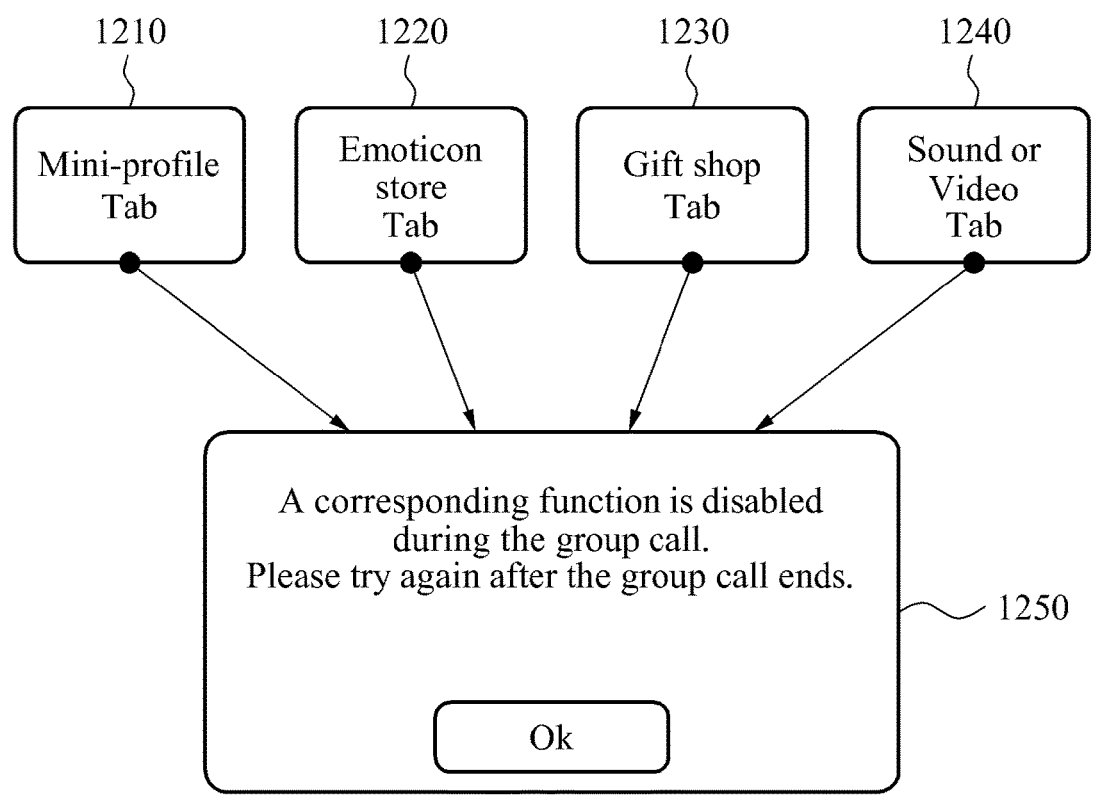
FIG. 12 is a diagram provided to explain a predetermined warning message associated with a function deactivated during a group call according to an embodiment.

FIG. 12 is a diagram provided to explain a predetermined warning message associated with a function deactivated during a group call according to an embodiment.

Referring to FIG. 12, an application according to an embodiment may deactivate at least one predetermined function associated with a group call chat room when a group call is ongoing.

The ongoing group call may indicate that at least two member among members in a group call chat room are participating in the group call even though a user of the application does not participate in the group call.

For example, the application may deactivate a function of inviting a new member to a group call chat room during the group call. In this example, the application may deactivate a settings menu of the group call chat room, to deactivate the function of inviting the new member to the group call chat room.

Also, the application may deactivate at least one of a video playback function, a sound playback function, a gift shop function, an emoticon store function and a mini-profile function in the group call chat room during the group call. In FIG. 12, when a single interface is selected from an interface 1210 corresponding to the mini profile function, an interface 1220 corresponding to the emoticon store function, an interface 1230 corresponding to the gift shop function, and an interface 1240 corresponding to the video playback function or the sound playback function, the application may provide a user with a warning message 1250 saying that a corresponding function is disabled.

Figure 13:
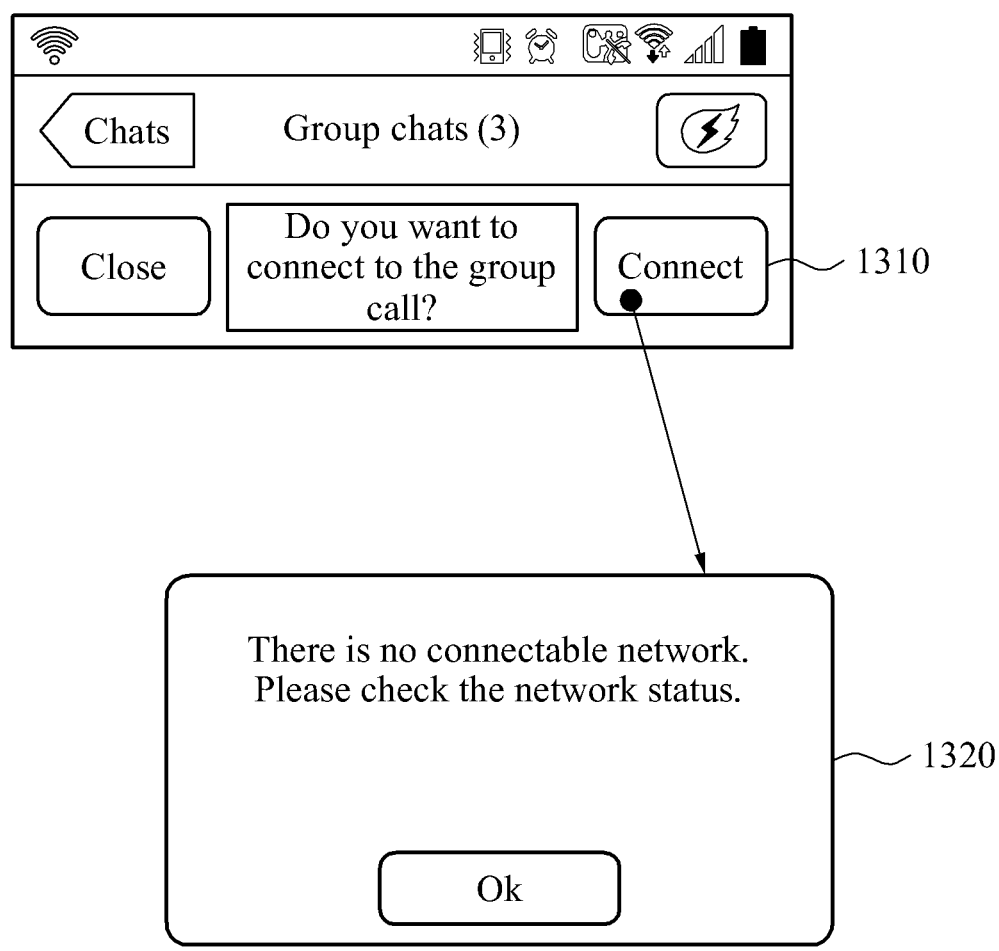
FIG. 13 is a diagram provided to explain a predetermined warning message associated with a network error according to an embodiment.

FIG. 13 is a diagram provided to explain a predetermined warning message associated with a network error according to an embodiment.

Referring to FIG. 13, when participation in a group call now is impossible due to a network error, even though an input 1310 to participate in the group call now is received, an application according to an embodiment may provide a user with a warning message 1320 saying a network error.

Figure 14:
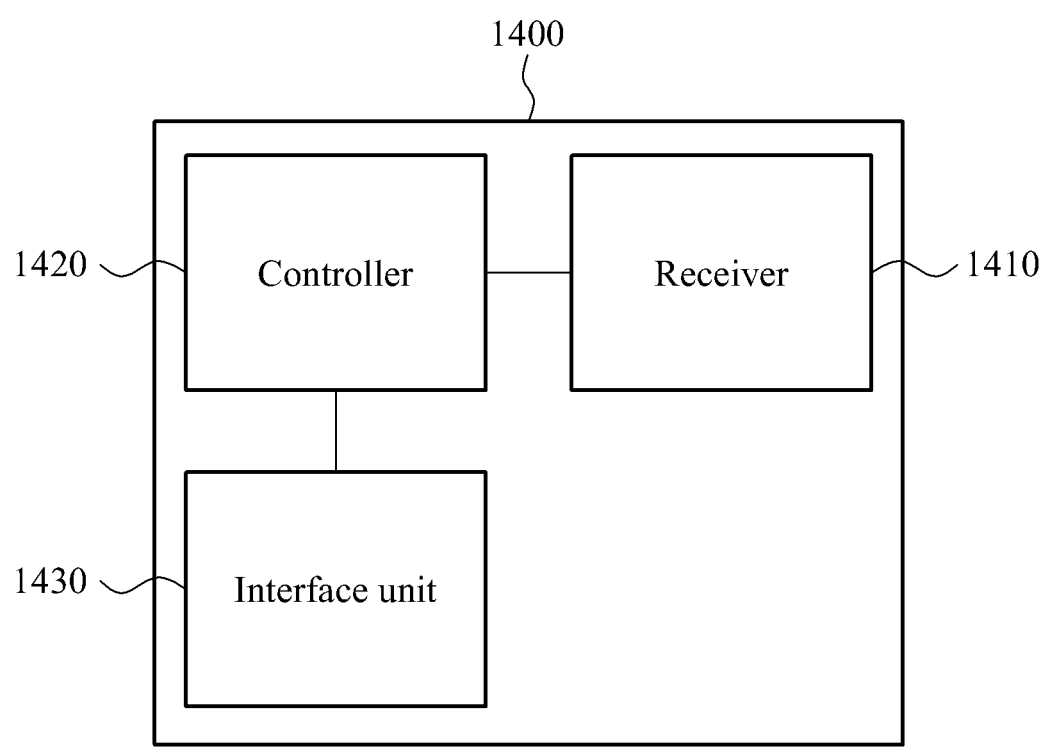
FIG. 14 is a block diagram illustrating a mobile terminal for providing a group call service using an mVoIP according to an embodiment.

FIG. 14 is a block diagram illustrating a mobile terminal for providing a group call service using an mVoIP according to an embodiment.

Referring to FIG. 14, a mobile terminal 1400 may include a receiver 1410. The receiver 1410 may include a request signal receiver and a meta information receiver, although not shown in FIG. 14.

The request signal receiver may receive a request signal for a group call. The meta information receiver may receive meta information for a group call chat room corresponding to the group call from a server, regardless of participation in the group call. The meta information may at least include a group call connection status of each of members in the group call chat room.

The mobile terminal 1400 may further include a controller 1420 and an interface unit 1430.

The interface unit 1430 may be a module configured to provide an input interface or an output interface to a user of the mobile terminal 1400, and may include, for example, a display, a keypad, or a touch screen.

The controller 1420 may control the interface unit 1430 based on information received by the receiver 1410, and may perform operations to provide the group call service.

For example, in response to a request signal being received by the receiver 1410, the controller 1420 may control the interface unit 1430 to provide an interface used to receive an input on whether to participate in the group call now or later.

In an example, in response to an input to participate in the group call now being received via the interface unit 1430, the controller 1420 may automatically enter the group call chat room.

In another example, in response to an input to participate in the group call later being received via the interface unit 1430, the controller 1420 may not automatically enter the group call chat room. In this example, the controller 1420 may control the interface unit 1430 to provide an interface enabling participation in the group call without a need to receive again the request signal when entering the group call chat room later.

In addition, the controller 1420 may control the interface unit 1430 to provide an indicator including information regarding the group call. The information regarding the group call may include a group call connection status of each of members in the group call chat room.

The above description of FIGS. 1 through 13 may equally be applicable to each module of FIG. 14 and accordingly, will not be repeated here.

The units and/or modules described herein may be implemented using hardware components, software components, or a combination thereof. For example, the units and/or modules may include a processor, a controller and an arithmetic logic unit (ALU), a digital signal processor, a microcomputer, a field programmable array (FPA), a programmable logic unit (PLU), a microprocessor or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

The invention claimed is:

1. A method of operating an application providing, on a mobile device, a group call service using a mobile voice over Internet protocol (mVoIP), the method comprising:
   receiving a request signal for a group call;
   receiving meta information or a group call chat room corresponding to the group call from a server, regardless of participation in the group call, wherein the meta information at least comprises a group call connection status of each of a plurality of members in the group call chat room;
   providing an interface used to receive an input on whether to participate in the group call now or later, in response to the request signal being received;
   automatically entering the group call chat room, in response to an input to participate in the group call now being received;
   providing an interface enabling participation in the group call without a need to receive again the request signal when entering the group call chat mom later, instead of automatically entering the group call chat room, in response to an input to participate in the group call later being received; and
   providing information regarding the group call using an indicator provided in the group call chat room, the information regarding the group call comprising the group call connection status,
   wherein the information regarding the group call further comprises a profile photo of each of the members, and
   wherein the providing of the information regarding the group call comprises adjusting, for each of the members, a dimness of the respective profile photo based on the respective group call connection status.

2. The method of claim 1, wherein the request signal comprises request caller information and request receiver information, the request caller information comprises information associated with a single request caller, and the request receiver information comprises information associated with at least two request receivers.

3. The method of claim 1, wherein, for each of the plurality of members in the group call chat room, the group call connection status is selected from the group comprising: a status indicating that a connection is being attempted, a status indicating that a connection is established, a status indicating that the connection is terminated, and a status indicating that the connection could not be made, and
   wherein the server changes the group call connection status for a member of the group call chat room to the status indicating that the connection is terminated when, for the member of the group call chat room, the status indicating that a connection is being established continues during a predetermined period of time.

4. The method of claim 1, wherein the meta information further comprises at least one of a period of time of participation in the group call, a network connection status for the group call, and a member requesting the group call.

5. The method of claim 1, further comprising at least one of:
providing at least one of an interface used to activate at least one of a voice change function, a mute function and a speakerphone function using an indicator provided in the group call chat room, an interface used to terminate the group call, and an interface used to fold or unfold the indicator; and
providing information indicating that a participant is participating in the group call to an indicator associated with a background mode, in response to a reception of an input to allow the application to be executed in the background mode during participation in the group call.

6. The method of claim 5, wherein the method comprises providing information indicating that a participant is participating in the group call to the indicator associated with the background mode, and further comprising:
terminating the group call, in response to an input to terminate the group call being received; and
providing an interface enabling participation in the group call without a need to receive again the request signal, and the information indicating that a participant is participating in the group call using the indicator associated with the background mode.

7. The method of claim 1, further comprising:
receiving a group call termination signal from the server; and
deactivating a group call-related function provided in the group call chat room, in response to the group call termination signal being received,
wherein the server transmits the group call termination signal based on a number of members currently participating in the group call.

8. A non-transitory computer-readable storage medium comprising a program comprising instructions to cause a computer to perform the method of claim 1.

9. A mobile terminal for providing a group call service using a mobile voice over Internet protocol (mVoIP), the mobile terminal comprising:
a processor implemented as hardware; and
a receiver,
wherein the receiver comprises:
a request signal receiver to receive a request signal for a group call; and
a meta information receiver to receive meta information for a group call chat room corresponding to the group call from a server, regardless of participation in the group call, and
wherein the meta information at least comprises a group call connection status of each of members in the group call chat room, and
wherein the processor is configured to:
provide an interface used to receive an input on whether to accept the request signal in response to the request signal being received; enter the group call chat room, in response to an input to accept the request signal being received;
provide information regarding the group call using an indicator provided in the group call chat room, the information regarding the group call comprising the group call connection status of each of the members in the group call chat room;
provide an interface used to receive an input on whether to participate in the group call now, using the indicator; and
provide an interface enabling participation in the group call without a need to receive again the request signal, in response to an input to participate in the group call later being received.

10. The mobile terminal of claim 9, further comprising:
an interface unit, and
wherein in response to the request signal being received, the processor controls the interface unit to provide an interface used to receive an input on whether to participate in the group call now or later,
wherein in response to an input to participate in the group call now being received via the interface unit, the processor automatically enters the group call chat room;
wherein in response to an input to participate in the group call later being received via the interface unit, the processor does not automatically enter the group call chat room and controls the interface unit to provide an interface enabling participation in the group call without a need to receive again the request signal when entering the group call chat mom later, and
wherein the processor controls the interface unit to provide an indicator comprising information regarding the group call and the information regarding the group call comprises the group call connection status.

11. A method of operating an application providing a group call service using a mobile voice over Internet protocol (mVoIP), the method comprising:
receiving, by the application, a request signal for a group call;
providing, by the application, a message corresponding to the request signal through a group chat nom corresponding to the group call;
providing, by the application, an interface used to receive an input on whether to participate in the group call;
providing, by the application, the group call service using the mVoIP in response to an input to participate in the group call being received; and
terminating, by the application, the group call service in response to receiving an input to terminate the group call, wherein at least one member of the group chat room is participating the group call;
providing, by the application, an interface of the group chat room without receiving a second request signal for the group call, the interface used to receive an input requesting to again participate in the group call; and
resuming, by the application, the group call service in response to the input requesting to participate in the group call again being received via the interface of the group chat room.

12. The method of claim 11, further comprising: receiving, by the application, a group call connection status for each of the members in the group call room; and providing, by the application, a screen including a profile photo of each of the members.

13. The method of claim 12, further comprising: adjusting, by the application, a graphic effect of the profile photo based on the group call connection status.

14. The method of claim 11, further comprising: providing, by the application, an interface used to activate at least one of a voice change function, a mute function or a speakerphone function.

15. The method of claim 11, further comprising: providing, by the application, an interface used to receive an input to allow the group call service to be provided in a background mode.

16. A non-transitory computer-readable storage medium comprising a program comprising instructions to cause a computer to perform the method of claim 11.

* * * * *